(12) United States Patent
Li (10) Patent No.: US 7,225,070 B2
(45) Date of Patent: May 29, 2007

(54) PARKING GUIDANCE SYSTEM FOR LARGE VEHICLES

(76) Inventor: Shih-Hsiung Li, 2F-7, No. 23, Sec. 1, Hangchow S. Rd., Taipei (TW)

( * ) Notice: Subject to any disclaimer, the term of this patent is extended or adjusted under 35 U.S.C. 154(b) by 666 days.

(21) Appl. No.: 10/763,840

(22) Filed: Jan. 22, 2004

(65) Prior Publication Data

US 2005/0165525 A1 Jul. 28, 2005

(51) Int. Cl.
*G06F 19/00* (2006.01)
(52) U.S. Cl. .................. 701/49; 701/36; 348/148; 340/943; 340/932.2; 340/937; 340/435; 340/438; 340/901; 340/903; 340/436; 342/70
(58) Field of Classification Search .................. 701/36, 701/49; 340/943, 932.2, 937, 435, 438, 436, 340/901, 903; 342/70; 348/148
See application file for complete search history.

(56) References Cited

U.S. PATENT DOCUMENTS

| | | | | |
|---|---|---|---|---|
| 2,521,683 | A * | 9/1950 | Barker | 342/69 |
| 4,361,202 | A * | 11/1982 | Minovitch | 180/168 |
| 4,654,834 | A * | 3/1987 | Dorr | 367/96 |
| 5,208,586 | A * | 5/1993 | Friberg et al. | 340/932.2 |
| 5,483,501 | A | 1/1996 | Park et al. | |
| 5,845,268 | A * | 12/1998 | Moore | 705/418 |
| 6,114,950 | A * | 9/2000 | Schaible et al. | 340/435 |
| 6,229,455 | B1 * | 5/2001 | Yost et al. | 340/943 |
| 6,232,910 | B1 * | 5/2001 | Bell et al. | 342/70 |
| 6,400,308 | B1 * | 6/2002 | Bell et al. | 342/71 |
| 6,670,910 | B2 * | 12/2003 | Delcheccolo et al. | 342/70 |
| 6,784,828 | B2 * | 8/2004 | Delcheccolo et al. | 342/70 |
| 6,812,857 | B1 * | 11/2004 | Kassab et al. | 340/932.2 |
| 6,873,250 | B2 * | 3/2005 | Viana et al. | 340/435 |
| 6,922,622 | B2 * | 7/2005 | Dulin et al. | 701/45 |
| 6,995,687 | B2 * | 2/2006 | Lang et al. | 340/932.2 |
| 7,026,922 | B1 * | 4/2006 | Talukder et al. | 340/442 |
| 7,068,211 | B2 * | 6/2006 | Oswald et al. | 342/70 |
| 2002/0008639 | A1 * | 1/2002 | Dee | 340/932.2 |
| 2002/0030591 | A1 | 3/2002 | Paranjpe | |
| 2002/0067287 | A1 * | 6/2002 | Delcheccolo et al. | 340/901 |
| 2002/0091991 | A1 * | 7/2002 | Castro | 717/106 |
| 2002/0121990 | A1 * | 9/2002 | Nomura et al. | 340/933 |
| 2002/0147534 | A1 * | 10/2002 | Delcheccolo et al. | 701/45 |
| 2003/0025596 | A1 * | 2/2003 | Lang et al. | 340/435 |
| 2003/0141965 | A1 | 7/2003 | Gunderson et al. | |
| 2003/0146826 | A1 * | 8/2003 | Viana et al. | 340/435 |
| 2003/0151541 | A1 * | 8/2003 | Oswald et al. | 342/70 |
| 2003/0221118 | A1 * | 11/2003 | Walker | 713/193 |
| 2004/0119633 | A1 * | 6/2004 | Oswald et al. | 342/70 |

(Continued)

FOREIGN PATENT DOCUMENTS

DE 9103492 3/1991

(Continued)

*Primary Examiner*—Cuong Nguyen
(74) *Attorney, Agent, or Firm*—James H. Walters (57) ABSTRACT

A parking guidance system for large vehicles has a horizontal bar, a data collection assembly and a console unit. The horizontal bar is hollow and is mounted on the rear bumper, and houses the data collection assembly. The data collection assembly uses multiple ultrasonic transmitter and detector modules and an option vide camera module. A console unit mounted in a driver compartment receives data from the data collection assembly and processes the data to proved warnings to a user.

17 Claims, 11 Drawing Sheets

U.S. PATENT DOCUMENTS

2005/0165525 A1* 7/2005 Li .............................. 701/36

FOREIGN PATENT DOCUMENTS

| DE | 10344464 | 4/2005 |
| --- | --- | --- |
| EP | 1273478 | 6/2002 |
| EP | 1293381 | 8/2002 |
| EP | 1273478 A2 * | 1/2003 |
| FR | 2852726 | 3/2004 |
| JP | 2003095045 A * | 4/2003 |
| WO | 2001/024137 | 4/2001 |
| WO | 01/65519 | 9/2001 |

\* cited by examiner

PARKING GUIDANCE SYSTEM FOR LARGE VEHICLES

BACKGROUND OF THE INVENTION

1. Field of the Invention

The present invention is related to a parking guidance system, and more particularly to a back-up sensor system installable on large vehicles and operated by wireless signal transmission.

2. Description of Related Art

Back-up sensors are becoming standard equipment in small passenger vehicles. Currently, dual-sensor versions and four-sensor versions are available on the market. In fact, small passenger vehicles only need a pair of back-up sensors on the rear bumper for obstacle detection when they are moving in the reverse direction.

However, current designs of back-up sensors make no distinction between passenger cars and large vehicles. Large vehicles such as trucks, trailers, buses and articulated vehicles require more than one pair of sensors around the sides and the back of the vehicles. Since their extended chassis and enormous bodies often block off a large portion of the driver's view especially around the rear section of such vehicles, additional sensors are required to cover the blind spots.

The conventional back-up sensors are hard-wired to a control box that is connected to a console unit in the driver compartment. For a large vehicle, the rear bumper is usually very far from the driver compartment. Therefore extensive wiring is needed to connect multiple back-up sensors on the vehicle bumper to the control box in the driver compartment. Also, this type of installation often involves drilling many holes in the external shell through which electrical wires pass to the driver's compartment.

Since back-up sensors are conventionally installed on the vehicle's rear bumper with external wiring, the sensors and the wiring are subject to wear and tear from nature and abrasive wear.

Therefore, conventional back-up sensor installations on large vehicles faced system reliability and complicated installation problems.

SUMMARY OF THE INVENTION

The main objective of the present invention is to provide a parking guidance system that is installable on large vehicles with a driver compartment and a distant rear bumper by average users without large amounts of external wiring.

A secondary objective of the present invention is to visually monitor conditions behind the vehicle.

The parking guidance system in accordance with the present invention includes a horizontal bar, a data collection assembly and a console unit.

The horizontal bar is hollow, is mounted on the rear bumper, houses the data collection assembly and has a front, at least one segment, at least one view port and optional mounting brackets. The horizontal bar can be mounted directly on or under a bumper or can be mounted under or over the bumper with the optional mounting brackets to adjust the height of the horizontal bar above the road surface.

The data collection assembly comprises multiple combination ultrasonic transmitter and detector modules, an assembly controller, a memory device, an optional video camera module and signal transmitter.

The assembly controller is mounted in the horizontal bar, has multiple inputs and multiple outputs and formats received data for transmission.

The memory device is mounted in the horizontal bar, is connected to the assembly controller and stores operational data used by the assembly controller.

The combination ultrasonic transmitter and detector modules are mounted in the horizontal bar, transmit ultrasonic signals, receive echoes and send the echoes, elapsed time and identification codes unique respectively to the individual combination ultrasonic transmitter and detector modules to the assembly controller.

When installed in the data collection assembly, the optional video camera module is mounted in the horizontal bar, is connected to the assembly controller and sends digital video data to the assembly controller.

The signal transmitter is mounted in the horizontal bar, is connected to the assembly controller and transmits RF signals.

The console unit is mounted in the driver compartment, receives data from the data collection assembly, stores preset thresholds, processes received data, displays the processed data, provides warnings to a user, provides electrical power to the entire parking guidance system and comprises a unit controller, a memory device, an alarm, a display, a signal receiver and a power supply.

Other objectives, advantages and novel features of the invention will become more apparent from the following detailed description when taken in conjunction with the accompanying drawings.

DETAILED DESCRIPTION OF THE PREFERRED EMBODIMENT

A parking guidance system installable on large vehicles in accordance with the present invention is illustrated through the description of a preferred embodiment. Users can install easily the parking guidance system without extensive external wiring because system communication is performed with wireless transmission.

Figure 1:
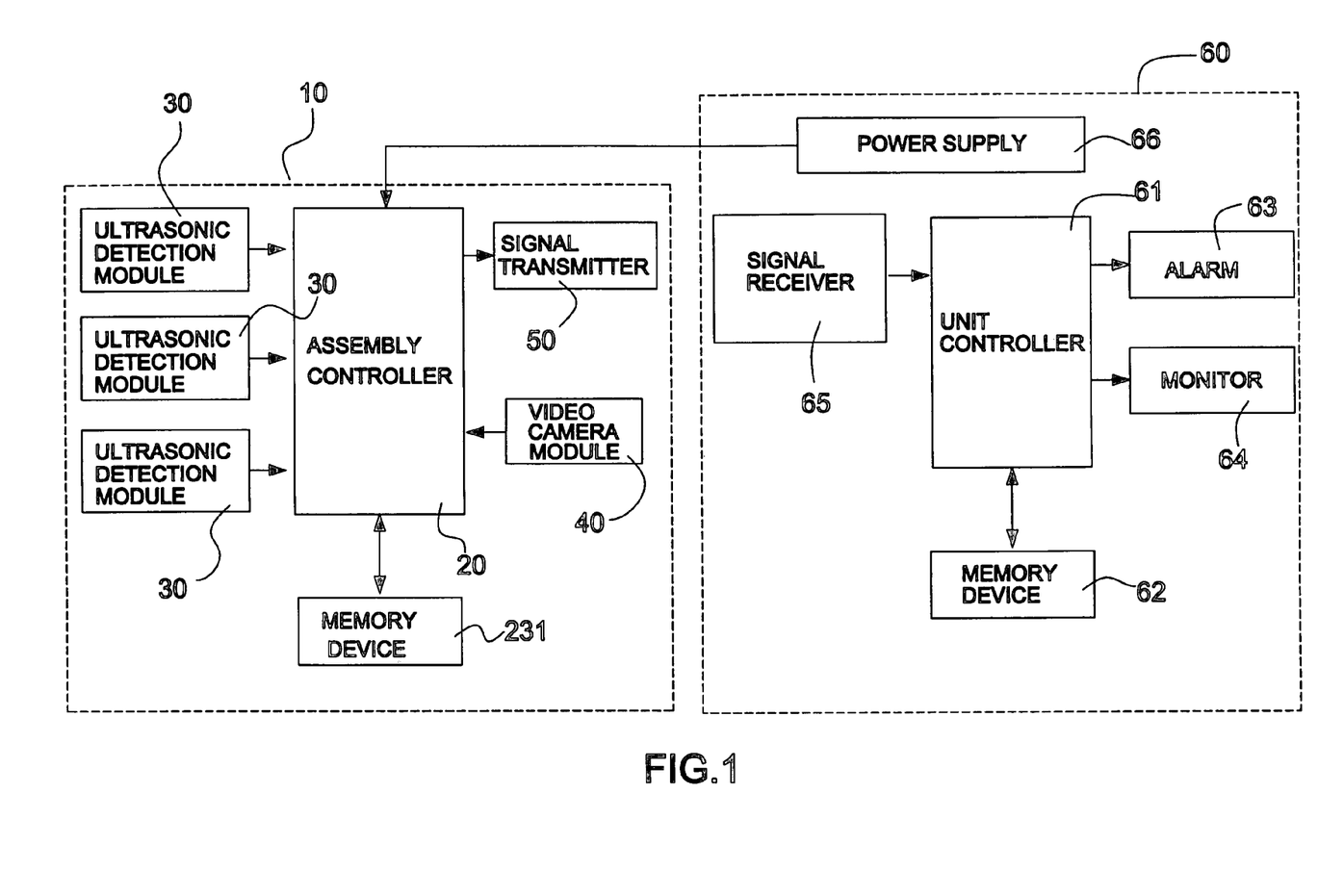
FIG. 1 is a functional block diagram of a parking guidance system installable on large vehicles in accordance with the present invention.
Figure 5:
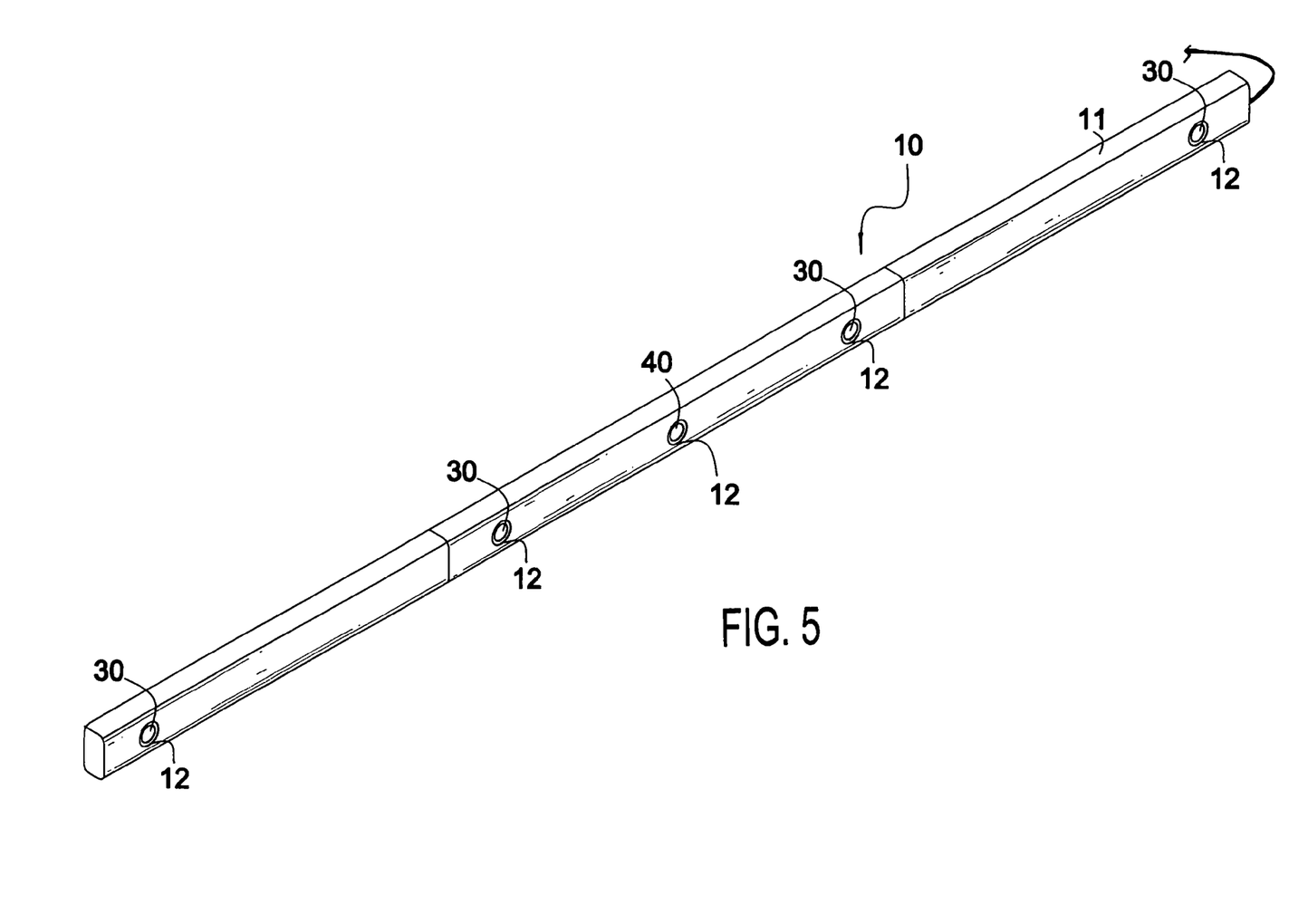
FIG. 5 is a perspective view of the parking guidance system in accordance with the present invention.

With reference to FIGS. 1 and 5, the parking guidance system in accordance with the present invention is mounted on large vehicles with a driver compartment, a distant rear bumper and a front bumper and comprises a horizontal bar (11), a data collection assembly (10) and a console unit (60). The data collection assembly (10) is housed in the horizontal bar (11) that is then attached to a front or a rear bumper, and the console unit (60) is mounted in the driver compartment.

With reference to FIG. 5, the horizontal bar (11) is hollow, is mounted on the rear bumper, houses the data collection assembly (10) and has a front (not numbered), at least one segment (not numbered), at least one view port and optional mounting brackets (14).

Figure 6:
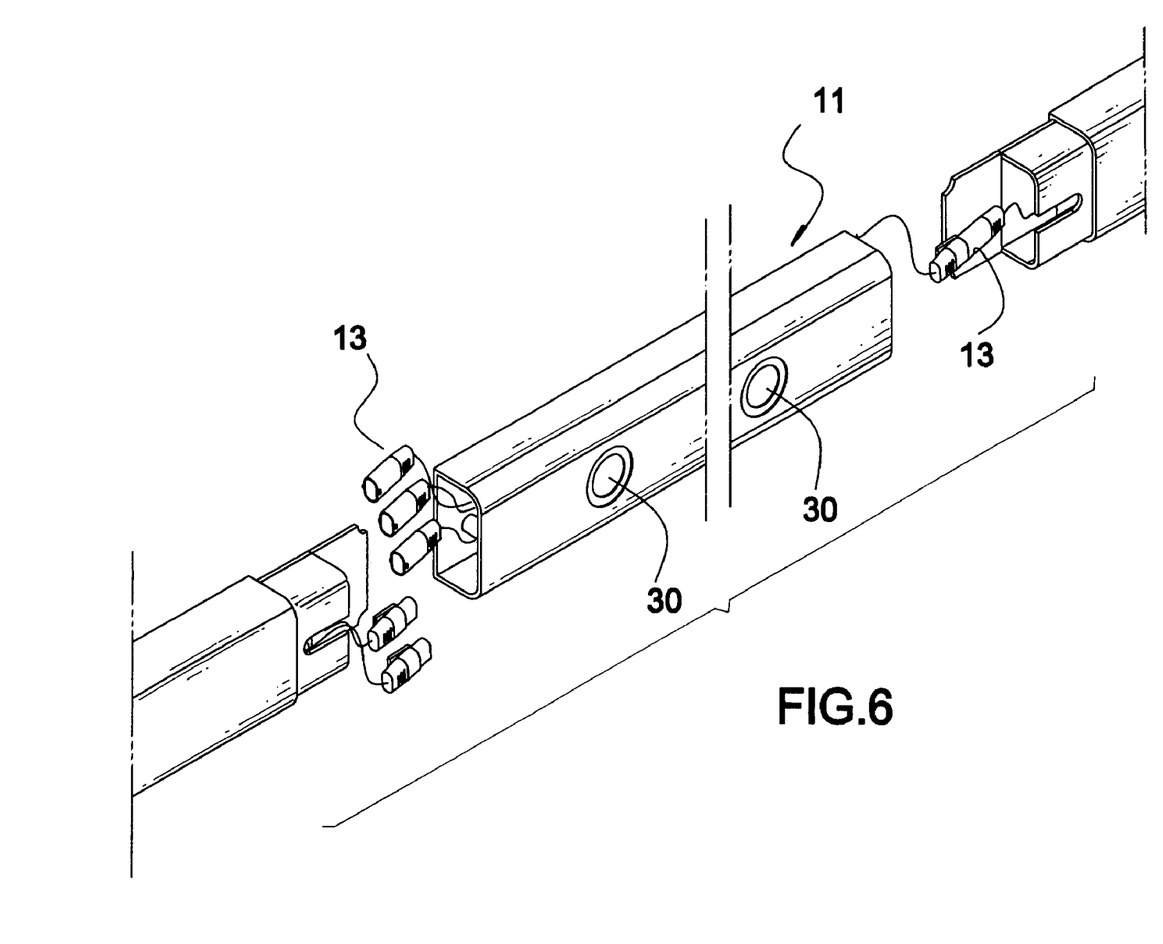
FIG. 6 is a perspective view of the horizontal bar in FIG. 5 with ultrasonic detector modules in the bar sections before assembly.

With reference to FIG. 6, one embodiment of the horizontal bar (11) is hollow rectangular parallelepiped tubing (not numbered) and has three sections (not numbered), a front (not numbered) and multiple view ports (not numbered). The three sections consist of a middle section (not numbered) and two end sections (not numbered) and have connectors (not numbered) to easily connect the end sections to the middle section. Components of the data collection assembly (10) mounted in the sections are interconnected with wire connectors (13). The view ports are implemented with through holes (12) formed in the front of the sections.

Figure 8:
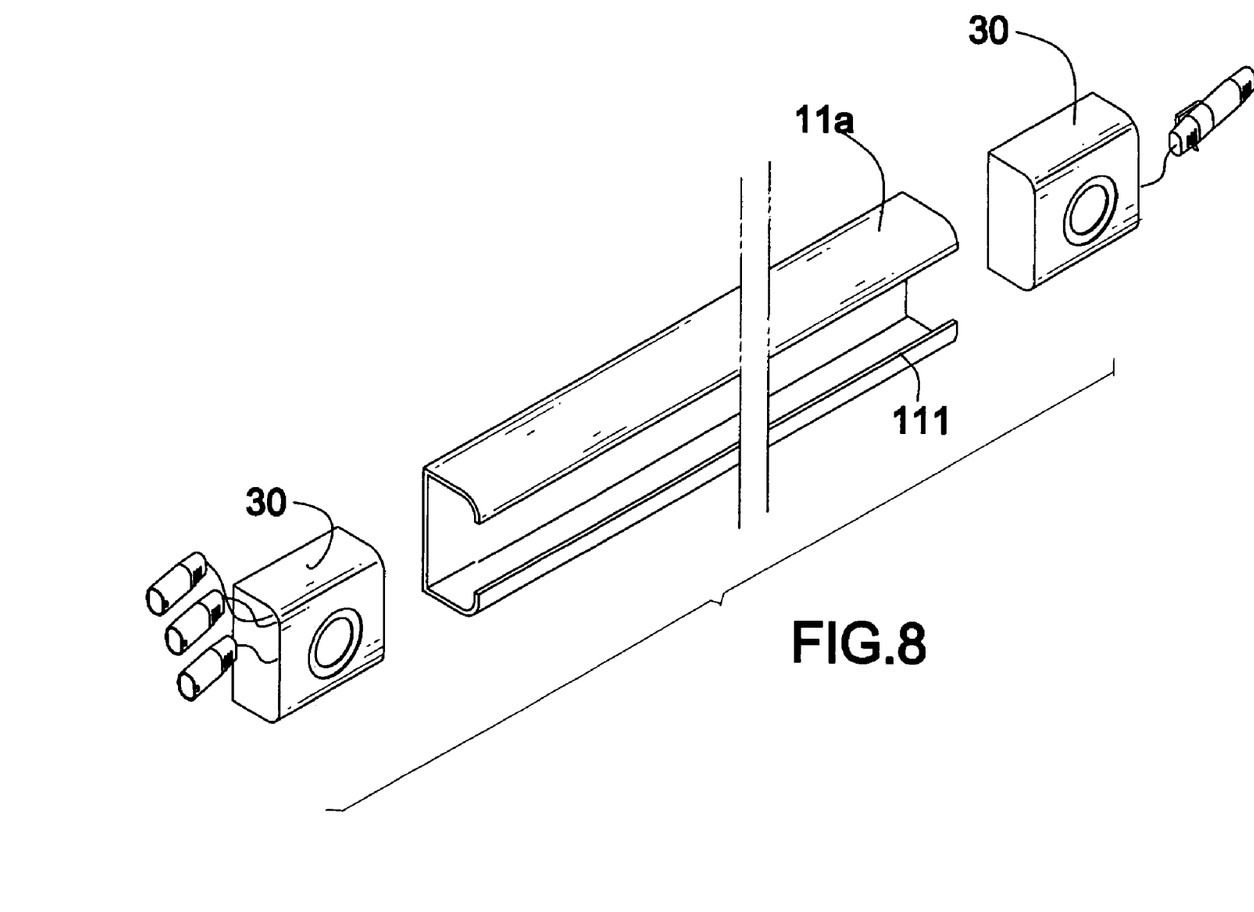
FIG. 8 is an exploded perspective view of a preferred embodiment of a segment of the horizontal bar of the parking guidance system in accordance with the present invention.

With reference to FIG. 8, another embodiment of the horizontal bar (11a) is the same as the previous embodiment except the view port is implemented as a longitudinal slot (111) in the front of the sections.

Figure 9:
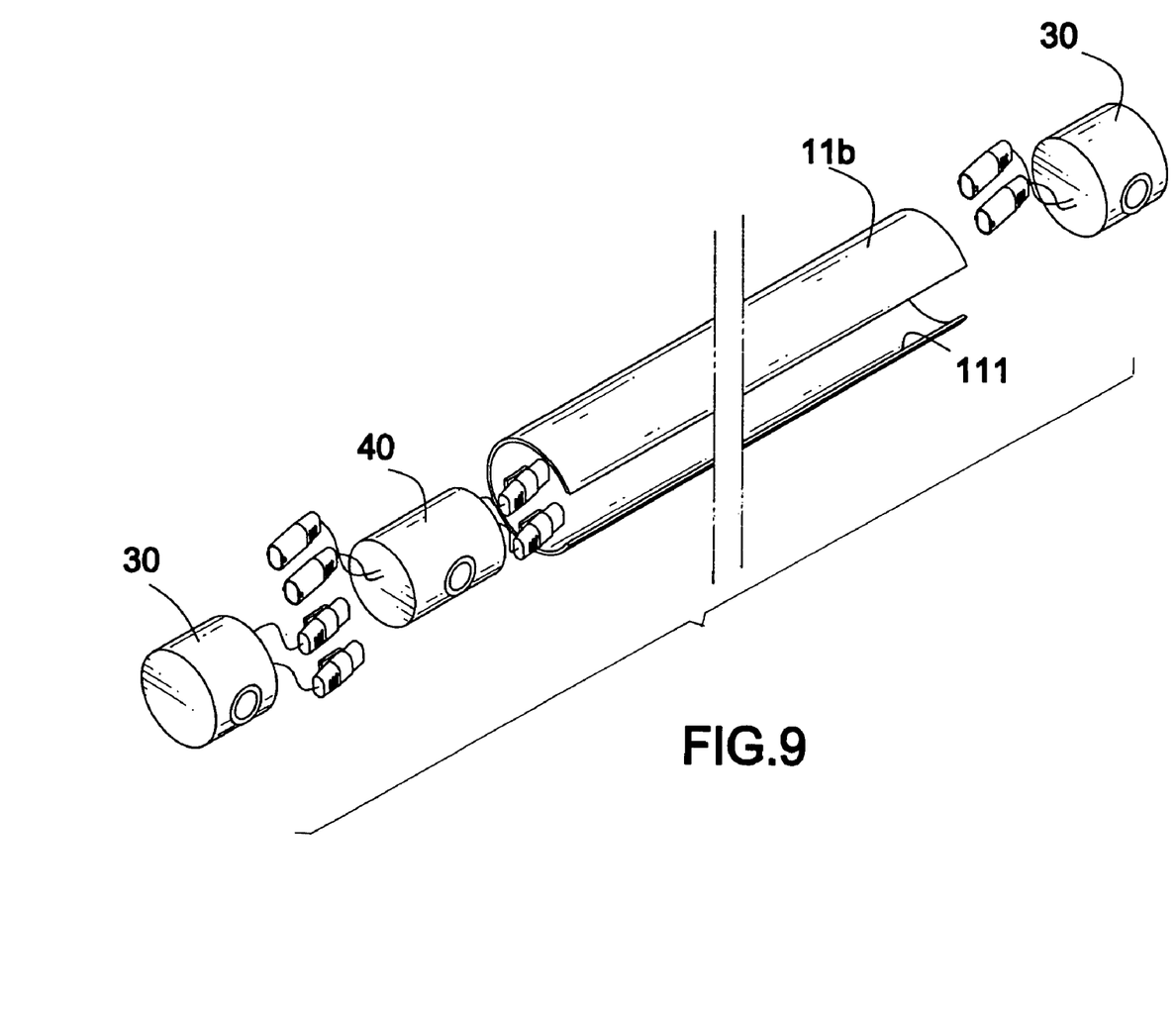
FIG. 9 is an exploded perspective view of another preferred embodiment of a segment of the horizontal bar of the parking guidance system in accordance with the present invention.

With reference to FIG. 9, another embodiment of the horizontal bar (11b) is cylindrical and has a view port implemented as a longitudinal slot (111) on the front.

Figure 7:
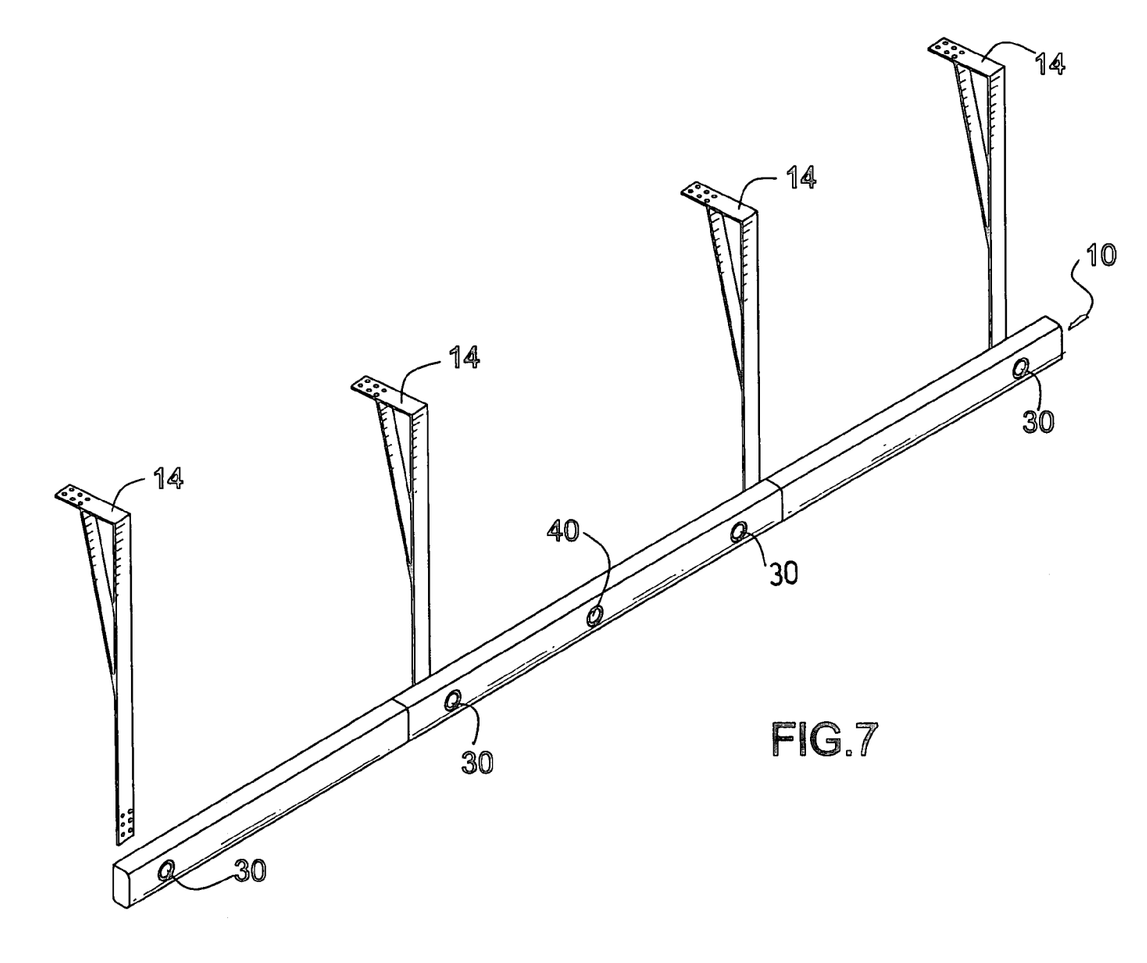
FIG. 7 is a perspective view of the horizontal bar in FIG. 5 and mounting brackets.
Figure 11:
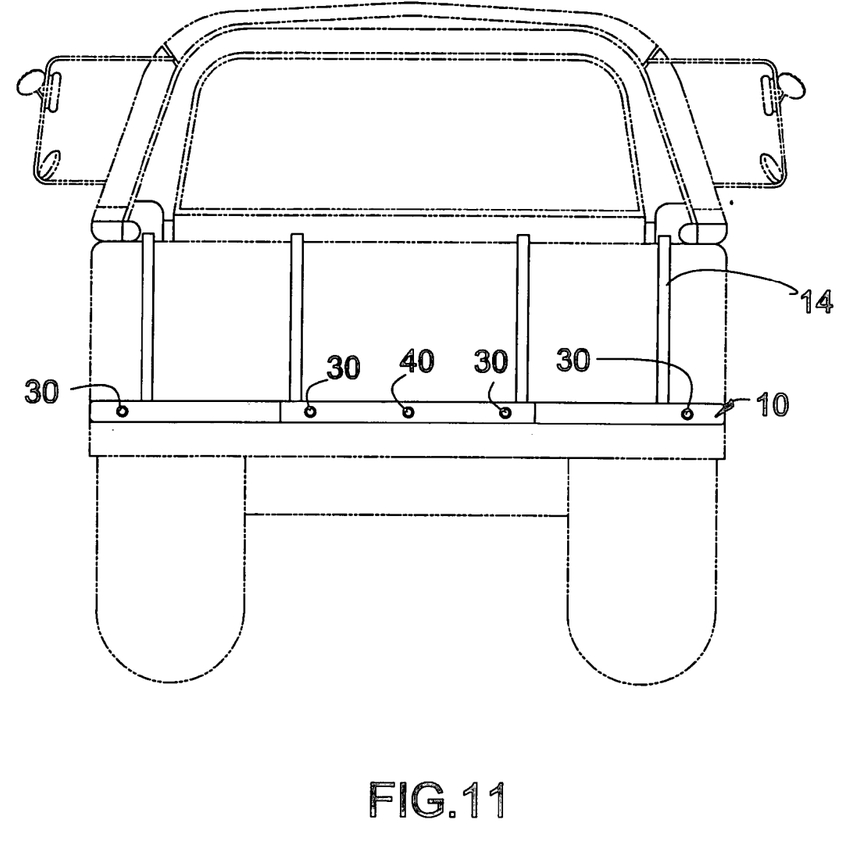
FIG. 11 is a rear plan view of a truck with the parking guidance system in FIG. 5 mounted on the tailgate of a truck with the aid of mounting brackets in FIG. 7.

The horizontal bar (11, 11a, 11b) can be attached directly to the vehicle bumper (70) by bolts. With further reference to FIGS. 7 and 11, an L-shaped mounting bracket (14) having a vertical leg (not numbered), a horizontal leg (not numbered), a proximal end (not numbered), a distal end (not numbered) and multiple optional holes (not numbered) can be used to attach the horizontal bar (11) to a bumper (not numbered). The proximal ends of multiple mounting brackets (14) are attached to a bumper with bolts, and then the horizontal bar (11, 11a, 11b) is attached to the distal end of the mounting bracket (14).

The optional holes are on the distal end and the proximal end of each mounting bracket (14) and can be used to micro-adjust the horizontal bar (11) and the mounting bracket (14) on the vehicle. With this flexible feature, the height and width of the detection zone can be suitably adjusted by users to accomplish desired results.

Figure 10:
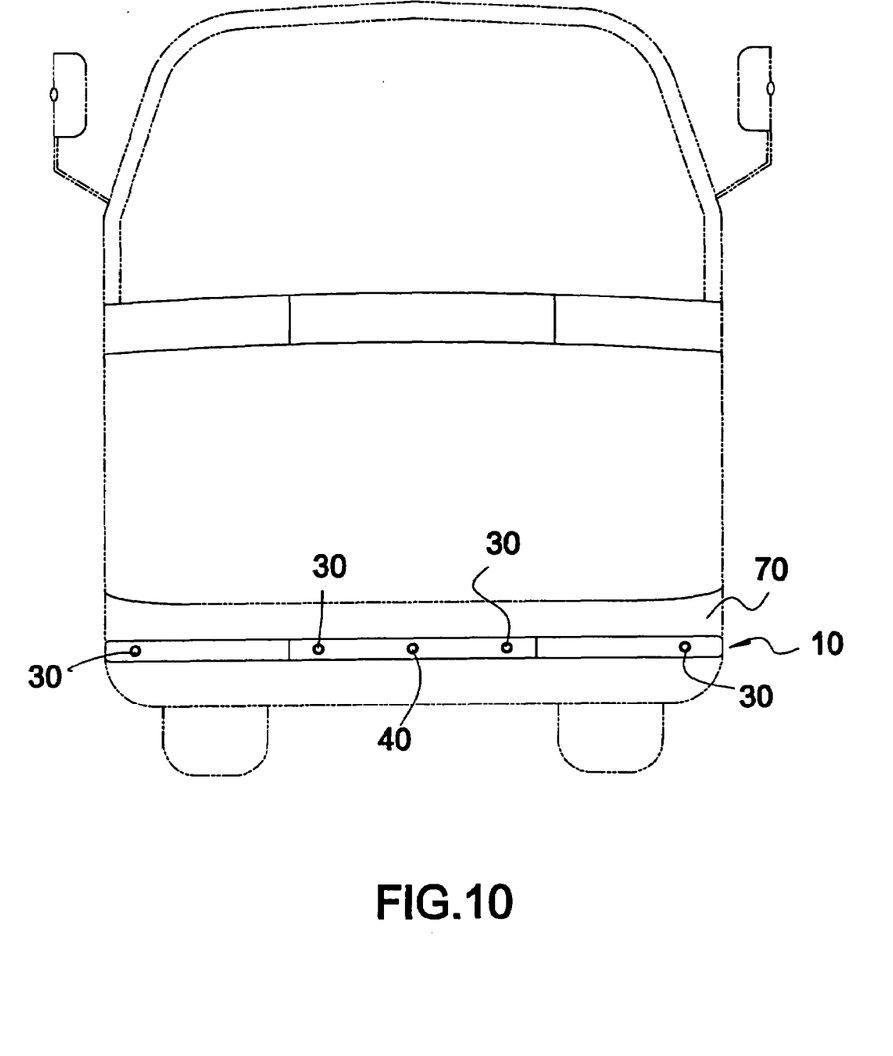
FIG. 10 is a front plan view of a bus with the parking guidance system in FIG. 5 mounted on the front bumper.

With reference to FIG. 10, the horizontal bar (11) of the back-up guidance system can be installed on the front bumper (70) of a bus. The horizontal bar (11) can be installed either on the front end, the back end or both ends of a vehicle, depending on the user's intended application and needs.

Figure 3:
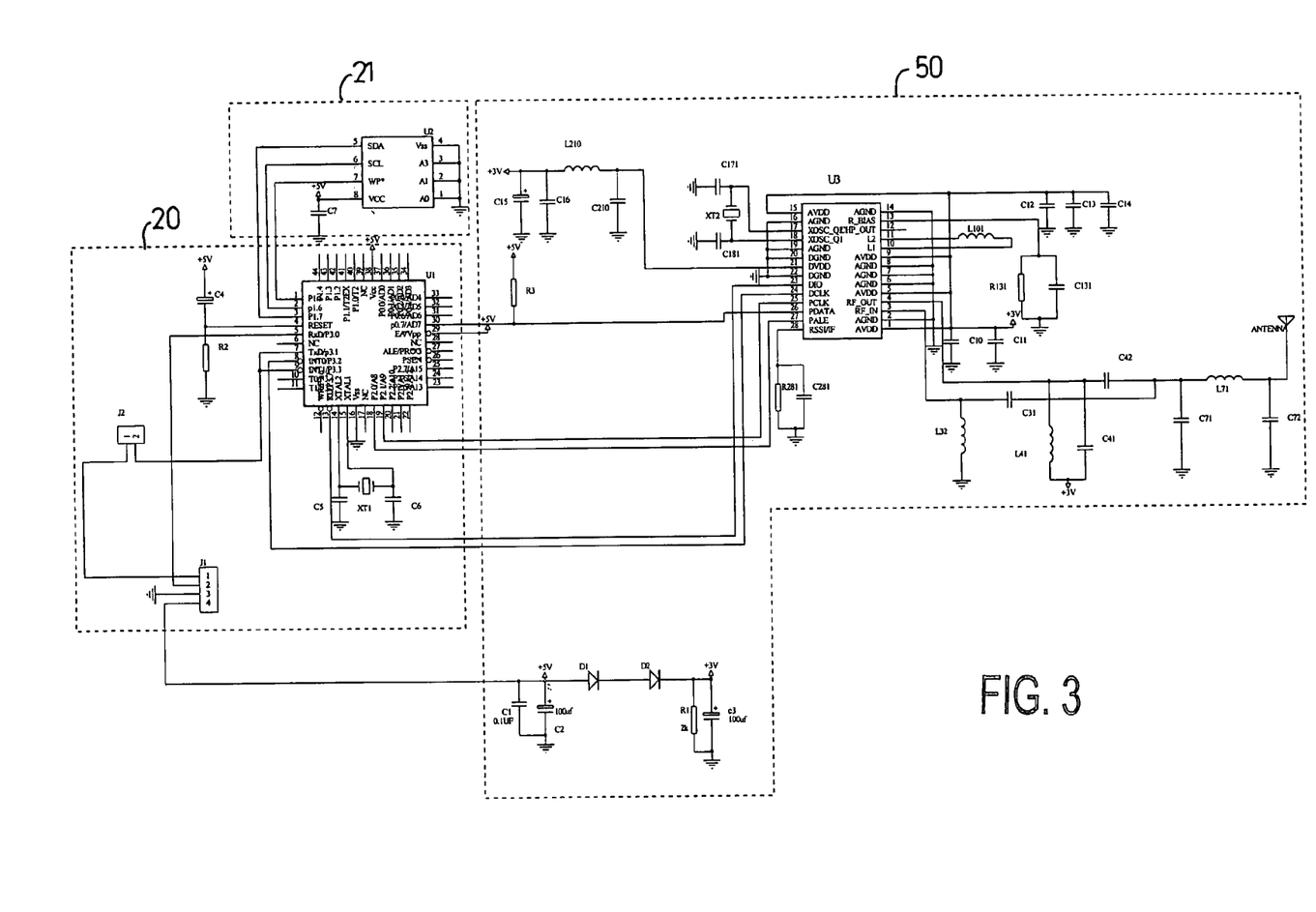
FIG. 3 is a partial wiring diagram of the data collection assembly in FIG. 1.

With further reference to FIG. 3, the data collection assembly (10) comprises an assembly controller (20), a memory device (21), multiple combination ultrasonic transmitter and detector modules (30), an optional video camera module (40) and a signal transmitter (50) and installed in the horizontal bar (11).

The assembly controller (20) has multiple inputs (not numbered) and multiple outputs (not numbered) and processes distance and video data for transmission.

The memory device (21) is connected to the assembly controller (20) and stores combination ultrasonic transmitter and detector module identification codes and parametric data.

Figure 4:
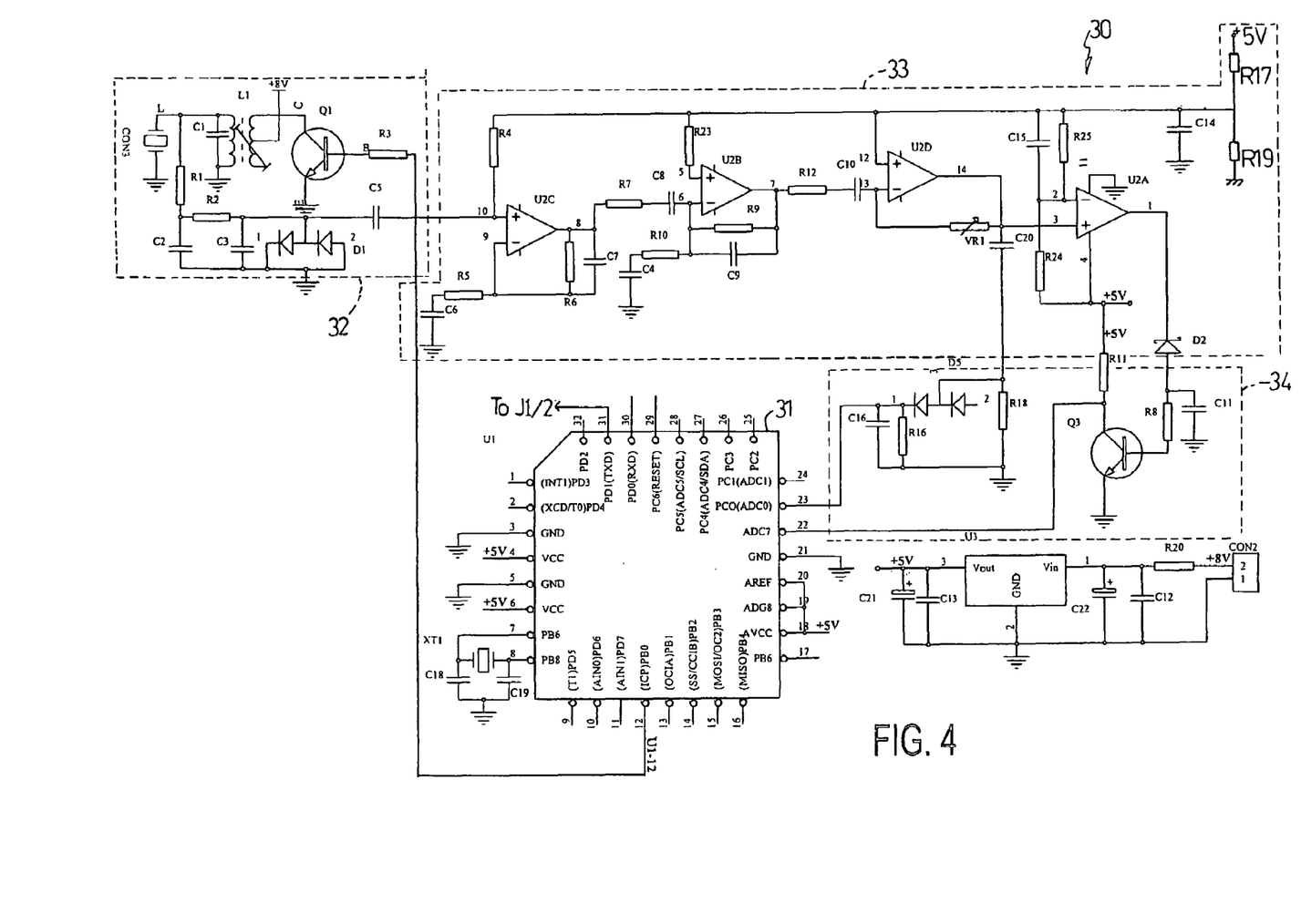
FIG. 4 is a wiring diagram of an ultrasonic detector module on FIG. 1.

The combination ultrasonic transmitter and detector modules (30) sense objects through the view port that the vehicle is approaching and are connected respectively to inputs of the assembly controller (20). With further reference to FIG. 4, each combination ultrasonic transmitter and detector module (30) consists of an ultrasonic transmitter and receiver unit (32) and a signal processing circuit (not numbered) and has a unique identification code. The signal processing circuit consists of a microprocessor (31), a signal amplifier (33) and an A/D signal converter (34). The microprocessor (31) is connected to the ultrasonic transmitter and receiver unit (32) to control the reception of echoed signals and to the assembly controller (20) to pass digital signals to the assembly controller (20).

The signal transmitter (50) is an RF signal transmission module, is connected to an output of the assembly controller (20) and transmits RF signals.

The optional video camera module (40) is mounted in the horizontal bar (11) and is connected to an input of the assembly controller (20) that processes the video and sends the video images to the signal transmitter (50) to be transmitted.

Figure 2:
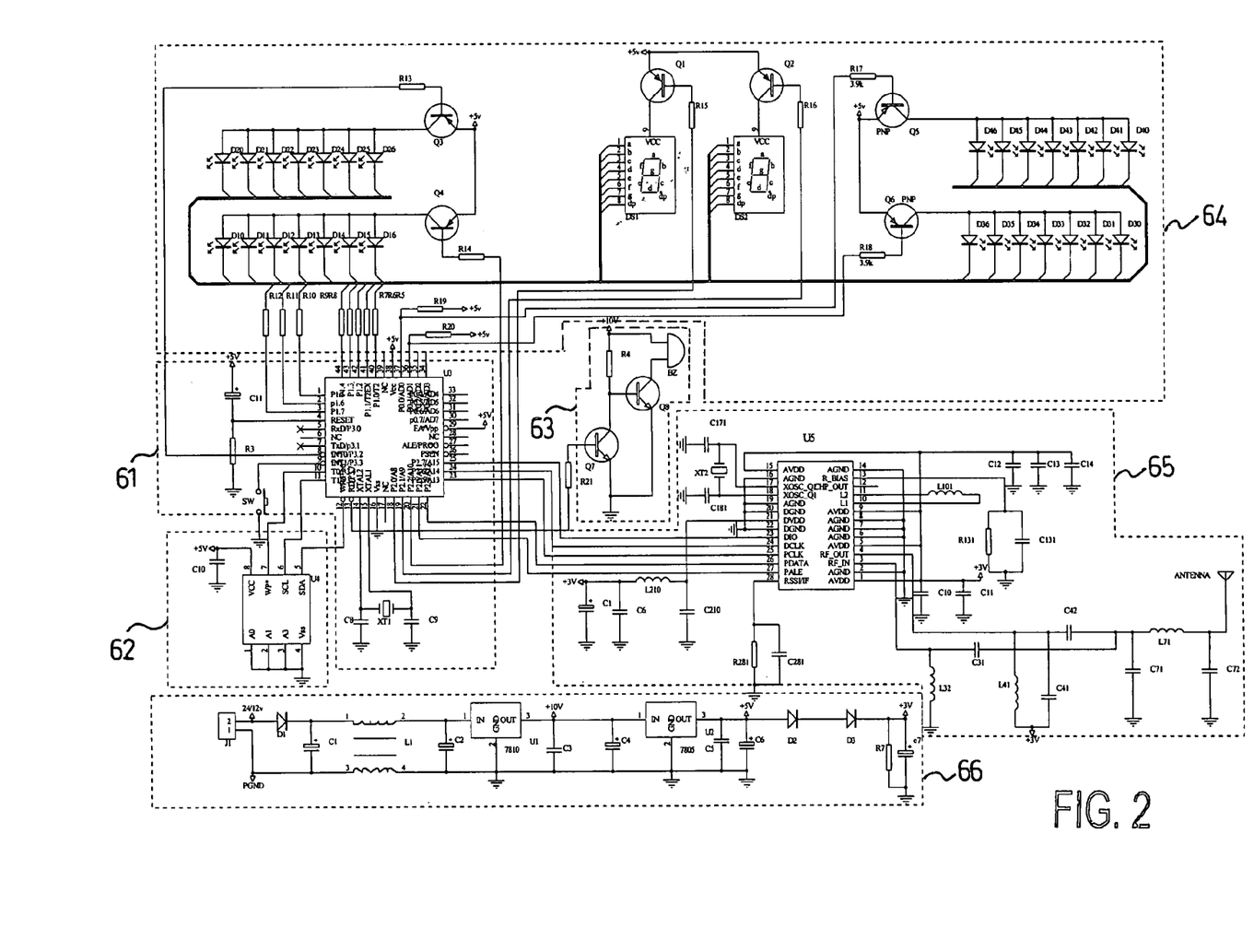
FIG. 2 is a wiring diagram of the console unit in FIG. 1.

With further reference to FIG. 2, the console unit (60) comprises a unit controller (61), a memory device (62), a signal receiver (65), an alarm (63), a monitor (64), a power supply (66) and an optional video camera module (not shown).

The unit controller (61) has multiple inputs, multiple outputs and multiple internal preset thresholds and analyzes distance data received from the data collection unit (10) to determine whether an object that the vehicle is approaching is within a threshold range and whether to initiate a warning to the driver.

The memory device (62) is connected to the unit controller (61) stores all combination ultrasonic transmitter and detector module identification codes and parametric data.

The signal receiver (65) is an RF signal receiver module, is connected to an input of the unit controller (61), receives RF signals from the signal transmitter (50) in the data collection assembly (10) and sends the RF signals received to the unit controller (61). The alarm (63) is connected to an output of the unit controller (61) and is activated by the unit controller (61) to warn the driver when an internal preset threshold is exceeded.

The monitor (64) is connected to an output of the unit controller (61) and displays images, distance data and messages.

The optional video camera module (not shown) may be connected directly to the console unit (60), so that video images can be sent directly to the monitor (64) without passing through the signal transmitter (50) and the signal receiver (65).

The power supply (66) provides an operating voltage to all system components and is hardwired to the data collection assembly (10).

A driver's awareness of a vehicle's surroundings can be greatly enhanced with the parking guidance system having a combination of the combination ultrasonic transmitters and detectors and video cameras by images and distance data being continuously presented to make the driver aware of changing road conditions and virtually eliminating blind spots.

Further, the wireless parking guidance system enables the amount of external wiring to be notably reduced, leaving only a power cable for electrical connection from the power supply of the console unit to the data collection unit.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A parking guidance system installable on large vehicles with a driver compartment, a bumper, the parking guidance system comprising
    a horizontal bar (11) being hollow, mounted on the bumper and having
        a front;
        at least one segment; and at least one view port on the front surface;
    a data collection assembly (10) being installed in the horizontal bar (11) and comprising:
        an assembly controller (20) having multiple inputs and multiple outputs and processing distance and video data for transmission;
        a memory device (21) connected to the assembly controller (20) and storing combination ultrasonic transmitter and detector module identification codes and parametric data;
        multiple combination ultrasonic transmitter and detector modules (30) to sense objects through the view port that the vehicle is approaching, connected respectively to inputs of the assembly controller (20) and having
            an ultrasonic transmitter and receiver unit (32);
            a signal processing circuit consisting of
                a microprocessor (31) connected to the ultrasonic transmitter and receiver unit (32) to control the reception of echoed signals and to the assembly controller (20) to pass digital signals to the assembly controller (20);
                a signal amplifier (33); and
                an A/D signal converter (34); and
            unique identification codes;
        a signal transmitter (50) being an RF signal transmission module, connected to the output of the assembly controller (20) and transmits RF signals; and
    a console unit (60) comprising
        a unit controller (61) having multiple inputs, multiple outputs and multiple internal preset thresholds and analyzing distance data received from the data collection unit (10) to determine whether an object the vehicle is approaching is within a threshold range and whether to initiate a warning to the driver;
        a memory device (62) connected to the unit controller (61) and storing all combination ultrasonic transmitter and detector module identification codes and parametric data;
        a signal receiver (65) being an RF signal receiver module, connected to an input of the unit controller (61), receiving RF signals from the signal transmitter (50) in the data collection assembly (10) and sending the RF signals received to the unit controller (61);
        an alarm (63) connected to an output of the unit controller (61) and being activated by the unit controller (61) to warn the driver when an internal preset threshold is exceeded;
        a monitor (64) connected to an output of the unit controller (61) and displaying images, distance data and messages; and
        a power supply (66) providing an operating voltage to all system components and being hardwired to the data collection assembly (10).

2. The parking guidance system according to claim 1, wherein the horizontal bar (11) is hollow rectangular parallelepiped tubing and has three sections, a front and multiple view ports.

3. The parking guidance system according to claim 2, wherein the three sections of the horizontal bar (11) consist of a middle section and two end sections and have connectors to easily connect the end sections to the middle section and components of the data collection assembly (10) mounted in the sections are interconnected with wire connectors (13).

4. The parking guidance system according to claim 2, wherein the view ports are implemented with through holes (12) formed in the front of the sections.

5. The parking guidance system according to claim 2, wherein the view ports are implemented as a longitudinal slot (111) in the front of the sections.

6. The parking guidance system according to claim 1, wherein the horizontal bar (11b) is cylindrical and has the view port implemented as a longitudinal slot (111) on the front.

7. The parking guidance system according to claim 1, wherein the data collection assembly (10) further includes a video camera module (40) mounted in the horizontal bar (11) through a corresponding view port.

8. The parking guidance system according to claim 7, wherein the video camera module (40) is connected to the assembly controller (20).

9. The parking guidance system according to claim 7, wherein the video camera module (40) is connected to the monitor (64) in the console unit (60).

10. The parking guidance system according to claim 1, wherein the console unit (60) further includes a video camera module (40) mounted in the horizontal bar (11) through a corresponding view port.

11. The parking guidance system according to claim 10, wherein the video camera module (40) is connected to the unit controller (61).

12. The parking guidance system according to claim 10, wherein the video camera module (40) is connected to the monitor (64).

13. The parking guidance system according to claim 1, wherein the horizontal bar (11) is attached directly to the vehicle bumper with bolts.

14. The parking guidance system according to claim 1, wherein the horizontal bar (11) has mounting brackets (14) being L-shaped and respectively having vertical legs, horizontal legs, proximal ends attached to the bumper with bolts and distal ends attached to the horizontal bar (11).

15. The parking guidance system according to claim 14, wherein the distal and proximal ends of each mounting bracket (14) has multiple holes to micro-adjust the horizontal bar (11) and the mounting brackets (14) on the vehicle.

16. A parking guidance device installable on large vehicles with a driver compartment, a bumper, the parking guidance system comprising a horizontal bar (11) being hollow, mounted on the bumper and having
a front;
at least one segment; and at least one view port on the front surface;
a data collection assembly (10) being installed in the horizontal bar (11) and comprising:
an assembly controller (20) having multiple inputs and multiple outputs and processing distance and video data for transmission;
a memory device (21) connected to the assembly controller (20) and storing combination ultrasonic transmitter and detector module identification codes and parametric data;
multiple combination ultrasonic transmitter and detector modules (30) to sense objects through the view port that the vehicle is approaching, connected respectively to inputs of the assembly controller (20); and a signal transmitter (50) being an RF signal transmission module, connected to the output of the assembly controller (20) and transmits RF signals.

17. The parking guidance device as claimed in claim 16, wherein each combination ultrasonic transmitter and detector module comprises:
an ultrasonic transmitter and receiver unit (32);
a signal processing circuit consisting of
a microprocessor (31) connected to the ultrasonic transmitter and receiver unit (32) to control the reception of echoed signals and to the assembly controller (20) to pass digital signals to the assembly controller (20);
a signal amplifier (33); and
an A/D signal converter (34); and
unique identification codes.

* * * * *